United States Patent [19]
Berkefeld

[11] Patent Number: 5,208,751
[45] Date of Patent: May 4, 1993

[54] ACTIVE FOUR-WHEEL STEERING SYSTEM FOR MOTOR VEHICLES

[75] Inventor: Volker Berkefeld, Renningen, Fed. Rep. of Germany

[73] Assignee: Dr. Ing. h.c.F. Porsche AG, Fed. Rep. of Germany

[21] Appl. No.: 728,326

[22] Filed: Jul. 8, 1991

Related U.S. Application Data

[63] Continuation of Ser. No. 338,287, Apr. 14, 1989, abandoned.

[30] Foreign Application Priority Data

Apr. 19, 1988 [DE] Fed. Rep. of Germany ....... 3812957

[51] Int. Cl.$^5$ .............................................. B62D 5/06
[52] U.S. Cl. ............................ 364/424.05; 180/140; 180/142
[58] Field of Search ................... 364/424.05; 280/91, 280/99; 180/79.1, 140–143

[56] References Cited

U.S. PATENT DOCUMENTS

| | | | |
|---|---|---|---|
| 4,679,809 | 7/1987 | Ito et al. | 280/91 |
| 4,706,771 | 11/1987 | Kawabe et al. | 180/140 |
| 4,842,089 | 6/1989 | Kimbrough et al. | 180/140 |
| 4,874,054 | 10/1989 | Watanabe | 180/140 |

FOREIGN PATENT DOCUMENTS

3145618  6/1982  Fed. Rep. of Germany.

Primary Examiner—Gary Chin
Attorney, Agent, or Firm—Evenson, Wands, Edwards, Lenahan & McKeown

[57] ABSTRACT

An active four-wheel steering system for motor vehicles has steering devices for the front wheels and the rear wheels. These devices operate as a function of driving condition quantities fed to an electronic control unit. A variable wheel steering angle relationship with respect to the front wheels is adjusted, in which case the input signal concerning the steering wheel angle from a steering wheel angle sensor and the additional signal concerning the vehicle speed from a speed sensor is fed to a first function calculation task apparatus of the control unit. This function calculation task apparatus generates a first output signal for the lateral acceleration which, as an input signal, together with the additional input signal of the vehicle speed, is fed to a second function calculation task apparatus. In order to take a driving speed change into account, the output signal concerning the lateral acceleration, together with a signal from the driving speed change, is fed to the third function calculation task apparatus. This input signal, computed in the first function calculation task apparatus, and the input signals concerning the speed change, computed in the third function calculation task apparatus, are converted to an output signal additional rear wheel steering angle, which is overlayed on the output signal rear wheel steering angle. The sum of these output signals, as the steering angle signal, are fed to the control unit for the control of the hydraulic steering device for the rear wheels.

11 Claims, 5 Drawing Sheets

FRONT WHEEL STEERING ANGLE IN DEGREES $\delta_f = \delta_{f0} + C_1 \cdot a_y (+ C_2 \cdot a_y^2)$

FIG. 3B

SIDE SLIP ANGLE $\beta$ IN DEGREES $\beta = \beta_0 + C_3 \cdot a_y (+ C_4 \cdot a_y^2)$ LATERAL AXLE RATION $a_y$ IN M/S$^2$

LATERAL ACCELERATION

FIG. 7

LONGITUDINAL ACCELERATION

ACTIVE FOUR-WHEEL STEERING SYSTEM FOR MOTOR VEHICLES

This application is a continuation of application Ser. No. 07/338,287, filed Apr. 14, 1989 now abandoned.

BACKGROUND AND SUMMARY OF THE INVENTION

The present invention generally relates to an active four-wheel steering system for motor vehicles, and more particularly to a four-wheel steering system providing improved vehicle handling.

In German Published Unexamined Patent Application (DE-OS) 31 55 618, motor vehicles are disclosed having a four-wheel steering system which comprises steerable front and rear wheels, the rear wheels being controllable as a function of driving condition quantities which are calculated and/or measured and then fed to an electric control unit. For this purpose, the rear wheels are connected with an additional adjusting device for the control of the rear wheels which, corresponding to the actual driving condition quantities, can be adjusted in a certain relationship to the front wheels.

Thus, it is an object of the invention to provide a four-wheel steering system having front wheels actuated by a steering wheel and rear wheels controlled by an electronic control unit as a function of driving conditions, the rear wheels being adjusted with respect to the front wheels in a variable wheel steering angle relationship by means of which an improved vehicle handling is achieved in comparison to vehicles with conventional front-wheel steering systems.

According to the invention, these and other objects are achieved by generating a signal representative of the lateral acceleration (ay) of the vehicle from the driving speed (v) and front wheel steering angle ($\delta_f$) which, together with the driving speed (v) is employed to calculate the rear steering angle $\delta_r$ as a function of the vehicle speed (v) and the front wheel steering angle ($\delta_f$) so that the sideslip angle of the vehicle is reduced. Other advantageous characteristics will be evident as the description of the present invention proceeds.

Advantages achieved by the invention include:

improvement of vehicle handling at high speed (gain in directional control) and improvement of maneuverability at low speeds;

precise reaction of the vehicle to steering angle input by means of short response times during the buildup of a lateral acceleration;

better controlling of disturbance variables (cross wind, pavement irregularities) by the driver;

no delay of motion or oscillations of the vehicle following the end of steering maneuvers;

more indirect steering behavior at higher speeds;

high damping of the natural yaw frequency;

influencing of the vehicle reaction after powering-off and braking maneuvers;

small number of vehicle condition quantities that must be measured directly.

States of motion, in which the motor vehicle approaches the limits of directional control or is even without directional control, are generally characterized by the occurrence of larger sideslip angles. Further, the driving behavior of the motor vehicle depends considerably on the size of this sideslip angle or the change of the sideslip angle during transient cornering. The buildup of the sideslip angle after a steering maneuver results in a time delay in the rise of normal acceleration on the path and thus in a change of course. A steering wheel change is therefore not immediately followed by the desired change of course. Inversely, the reduction of the sideslip angle, during the transition to straight-ahead driving, leads to changes of course, although the driver, is no longer steering. This effect is felt as an "afterpushing" delay of motion during which the rear of the vehicle tends to swing forward and round towards the front of the vehicle. In addition, the sideslip angle represents a measurement for the directional control of the vehicle. Any reduction of the sideslip angle means that there is a gain in directional control.

The invention therefore has a particular object of adjusting the wheels in such a manner that the sideslip angle is reduced or that a reduction toward zero is caused. Since a direct measurement of the sideslip angle is expensive, it is determined from other quantities, for the purpose of which the vehicle is observed during steady state driving in a circle.

Figure 2:
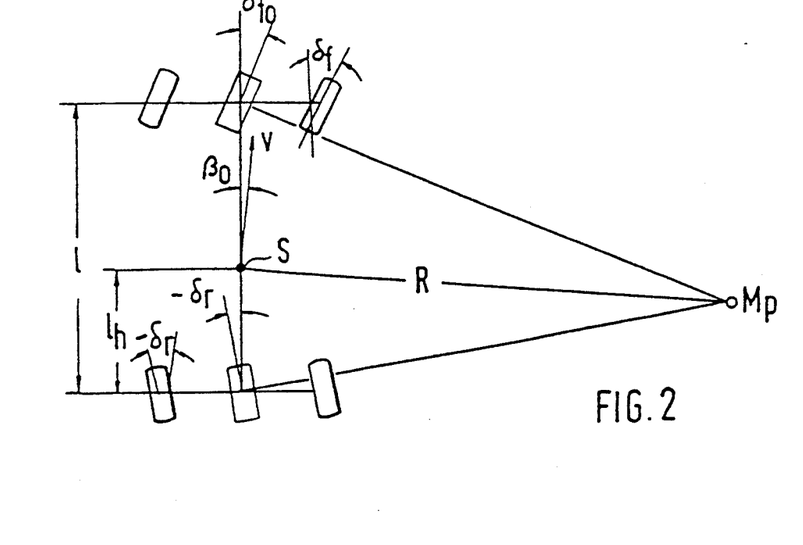
FIG. 2 is a representation of the geometrical relationship of a vehicle during a steady-state driving in a circle.

By means of the geometrical relationships of a vehicle during a steady-state driving in a circle at low speed (FIG. 2) the following is obtained by approximation for a front steering angle:

$$\delta_{fo}=(1/R)+\delta_r \qquad (1)$$

and for the sideslip angle $$\beta_o=(1\,l_h/R)+\delta_r \qquad (2)$$

wherein:

| | |
|---|---|
| l: wheel base | $\delta_r$: rear wheel steering angle |
| $l_h$: distance between the center of gravity(s) of the the vehicle and the rear axle | $\beta_o$: geometrical sideslip angle |
| R: radius | $\delta_{fo}$: geometrical front wheel steering angle |

Figure 3A:
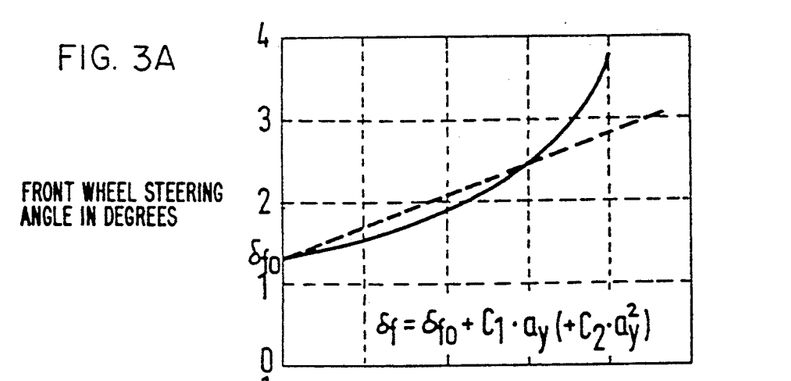
FIGS. 3A-3B are characteristic-curve diagram concerning the under behavior effect as a function of the lateral acceleration.
Figure 3B:
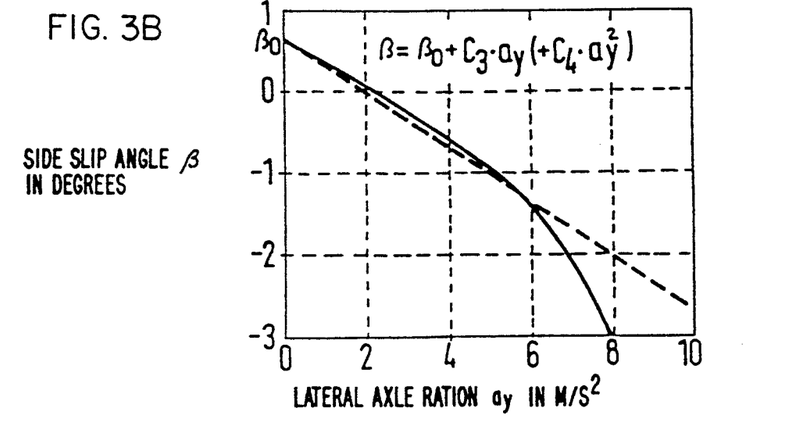

At higher speeds or lateral accelerations, the front wheel steering angle $\delta_f$ as well as the sideslip angle $\beta$ depend on the understeer/oversteer properties of the motor vehicle. The understeer/oversteer properties, in FIG. 3, are entered over the lateral acceleration $a_y$ of the vehicle. The characteristic curves to be measured for the front wheel steering angle front $\delta_f$ and the sideslip angle $\beta$ may be represented with good precision by means of polynomials of the second degree. Since the lateral acceleration $a_y$ of the vehicle is to be calculated from these polynomials, quadratic equations must be determined in the solution. As an example, the equations are linearized (FIG. 3), so that the front wheel steering angle $\delta_f$ is calculated from the equation:

$$\delta_f=\delta_{fo}+C_1\cdot a_y \qquad (3)$$

and the sideslip angle is calculated from the equation $$\beta=\beta_o+C_3\cdot a_y \qquad (4)$$

where $C_1$ and $C_3$ are constants.

However, it is also possible to process the quadratic equations in a corresponding control apparatus. The radius R of the circle which is driven by the vehicle is calculated by approximation from the equation $$R = v^2/a_y \qquad (5)$$

When equations (1), (3) and (5) are used, the front wheel steering angle ($\delta_f$) for a four-wheel steered vehicle is obtained from:

$$\delta_f = a_y((1/v^2) + C_1) + \delta_r \qquad (6)$$

and the sideslip angle ($\beta$) from equations (2), (4) and (5)

$$\beta = a_y((1_h/v^2) + C_3) + \delta_r \qquad (7)$$

The only unknown quantities in equations (6) and (7) are still the lateral acceleration $a_y$ and the rear wheel steering angles $\delta_r$. The driving speed v is available as a measured signal, and the front wheel steering angle $\delta_f$ is measured, for example, by means of a steering wheel angle sensor.

Under the condition that the sideslip angle $\beta$ is reduced to 0 degrees, the following is obtained for the lateral acceleration:

$$a_y = \frac{\delta_f}{\frac{1 - l_h}{v^2} + C_1 - C_3} \qquad (8)$$

and for the rear wheel steering angle $$\delta_r = -(l_h/v^2 + C_3) \cdot a_y \qquad (9)$$

In function calculation task apparatus, the lateral acceleration $a_y$ and the rear wheel steering angle $\delta_r$ are calculated from equations (8) and (9) from the input quantities driving speed v and front wheel steering angle $\delta_f$.

Figure 4:
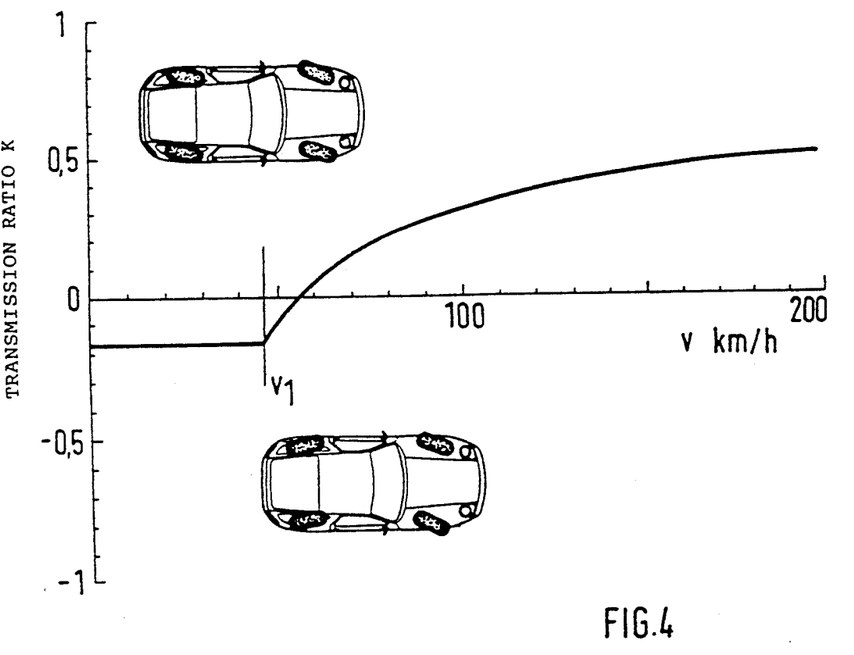
FIG. 4 is a diagram of a transmission ratio (K) of the rear wheel steering angle to the front wheel steering angle as a function of the driving speed.

In addition, according to the teachings of the present invention, as shown in FIG. 4, a transmission ratio k of the rear wheel steering angle to the front wheel steering angle can be shown over the vehicle speed v, in which case, in the speed range of more than, for example, 55 km/h, the rear wheels are steered in the same direction, making the steering behavior of the vehicle more indirect. In contrast, at a low speed, the rear wheels are steered in the opposite direction of the front wheels and improve the maneuverability of the vehicle.

Figure 6:
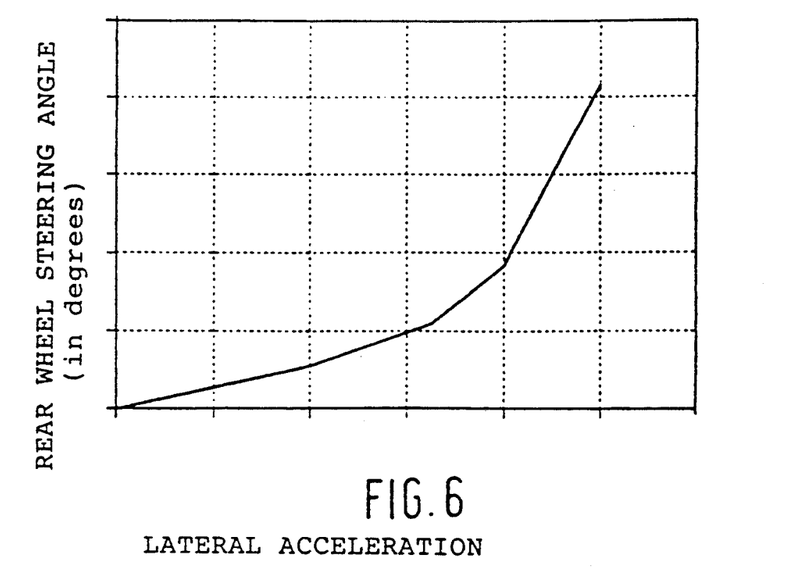
FIG. 6 is a characteristic-curve diagram illustrating an additional rear wheel steering angle $\delta'_{r,BL}$ as a function of the lateral acceleration (ay) of the vehicle by which the vehicle reaction can be influenced during braking and powering-off maneuvers.
Figure 7:
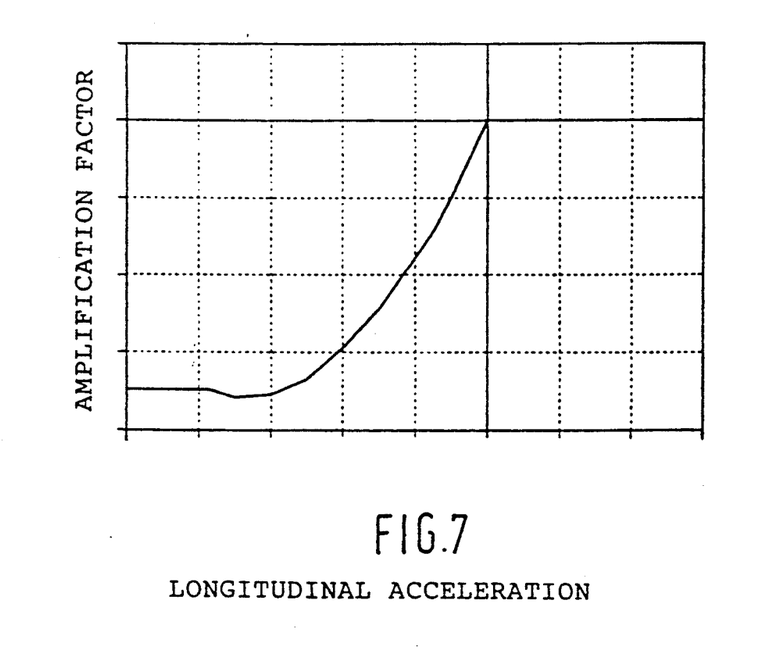
FIG. 7 is a characteristic-curve diagram of the amplification factor $V_{BL}$ during braking and powering off maneuvers as a function of the longitudinal deceleration.

In accordance with certain preferred embodiments of the present invention, by means of the adjustment of the steering angles at the rear wheels, the vehicle reaction can be influenced during the driving maneuvers powering off and braking from steady-state driving in a circle. This vehicle reaction depends on the actual lateral acceleration and longitudinal deceleration (FIG. 6 and 7). The lateral acceleration is known from equation (8), while the longitudinal deceleration is determined from a differentiating of the vehicle speed.

By means of the characteristic curve of FIG. 6, an additional rear wheel angle $\delta'_{r,BL}$ is first determined as a function of the lateral acceleration. This steering angle is multiplied by an amplification factor $V_{BL}$ (FIG. 7) as a function of the longitudinal deceleration. An effective steering angle:

$$\delta_{r,eff.} = \delta_r + V_{BL} \cdot \delta'_{r,BL}$$

is obtained which is composed of the sum of the rear wheel steering angles for the lateral and longitudinal dynamics.

When adjusting the rear wheels with respect to the front wheels as a function of determined driving condition quantities, it was found, among other things, that a vehicle with four-wheel steering has more direct steering characteristics when the radii are small and the speeds are low. In contrast, more indirect steering characteristics must be expected in the case of large radii and high speeds. This means for the driver that the vehicle does not have to be steered as carefully at high speeds, and that the vehicle reacts less violently to steering angle inputs.

Four-wheel steering also has an advantageous effect on the driving behavior of the vehicle during lane changes, because steering wheel angle changes, and changes of course are coupled with the shortest time delay. The vehicle reacts spontaneously in comparison to vehicles with front wheel steering. The phase angles of the yaw velocity and lateral acceleration are almost identical; the turning of the vehicle therefore takes place simultaneously with the change of course, whereas, in the case of conventional front-wheel steered vehicles, a change of course takes place only after the change of the steering wheel angle.

During a powering-off, while driving in a circle, a vehicle with front wheel steering has positive yaw velocity differences over the whole lateral acceleration range. As a result, the vehicle disadvantageously tends to turn into the circle, i.e. oversteers. By comparison, a vehicle with four-wheel steering acts neutral up to a relatively high lateral acceleration. At higher lateral accelerations, this vehicle will also be oversteering. A countersteering with the rear axle will no longer be sufficient, because the adhesion potential is utilized. However, the yaw response is reduced considerably. Up to a relatively high lateral acceleration, the four-wheel steered vehicle will move exactly along the desired path. The otherwise normal load change reaction is compensated.

When the vehicle is braked when driving in a circle, the directional control as well as the stability are improved considerably by means of the four-wheel steering. Not only the vehicle reaction during the braking operation can be reduced, but higher braking decelerations during cornering can also be achieved. Since a vehicle with front wheel steering reduces the path radius as a result of the braking maneuver, higher lateral accelerations are obtained which result in a locking of the front wheel which is on the inside during the cornering. As a result, the vehicle loses its maneuverability and turns out of the circle.

Thus, in accordance with certain preferred embodiments of the present invention, by means of a targeted time delay as a result of the interposition of a so-called delay-time element, it is advantageously achieved that either the input signal for the front steering wheel angle or the input signal for lateral acceleration is fed to the corresponding function calculation task apparatus in a delayed manner, whereby the rear wheel steering angle is implemented with respect to the front wheel steering angle with a time delay.

Since the longitudinal deceleration takes place before the powering off reaction, the value for the longitudinal deceleration must be delayed in time. For this purpose, a low-pass filter is provided to which the input signal of the longitudinal deceleration is fed. This low-pass filter provides a soft countersteering movement of the rear axle and avoids an abrupt adjustment of the rear wheels.

Other objects, advantages and novel features of the present invention will become apparent from the fol-

DETAILED DESCRIPTION OF THE DRAWINGS

Figure 1:
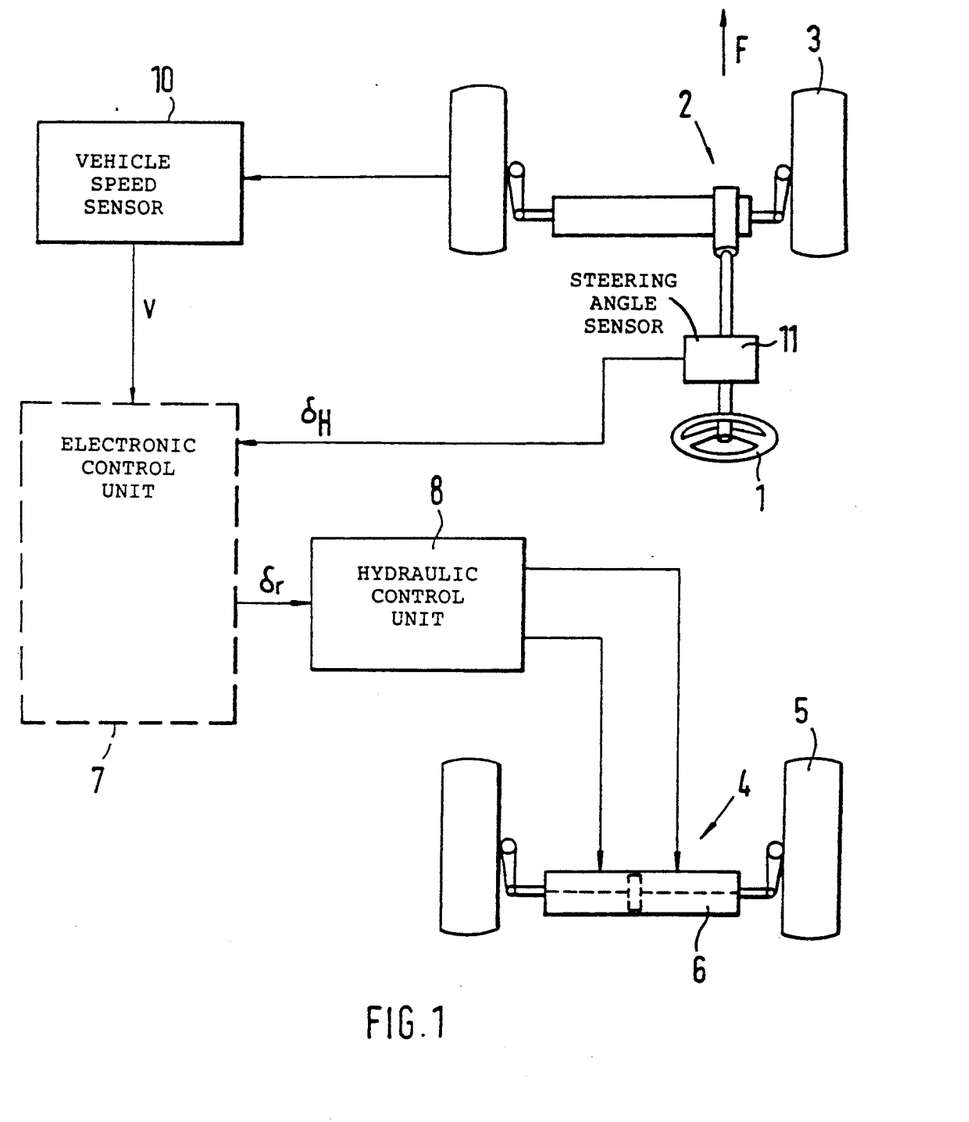
FIG. 1 is a block diagram for a vehicle having a four-wheel steering system in accordance with the teachings of the present invention.

The motor vehicle shown schematically in FIG. 1 comprises a steering device 2 for the front wheels 3 which is actuated by means of the steering wheel 1. Another electrohydraulic steering device 4 is provided between the rear wheels 5. This steering device 4 comprises essentially a hydraulic adjusting device consisting of a valve-controlled adjusting cylinder 6, which is connected with the wheels 3 by means of tie rods. A control of the adjusting cylinder 6 for the adjusting of the rear wheels 5 takes place as a function of determined vehicle condition quantities which are fed to an electronic control unit 7, such as a vehicle computer. This computer computes desired values for the steering angle $\delta_r$ rear wheels 5, which are fed to a hydraulic control unit 8, which, by means of a pump, generates the working pressure for the adjusting cylinders 6 required for the adjustment of the rear wheels 5.

Figure 5:
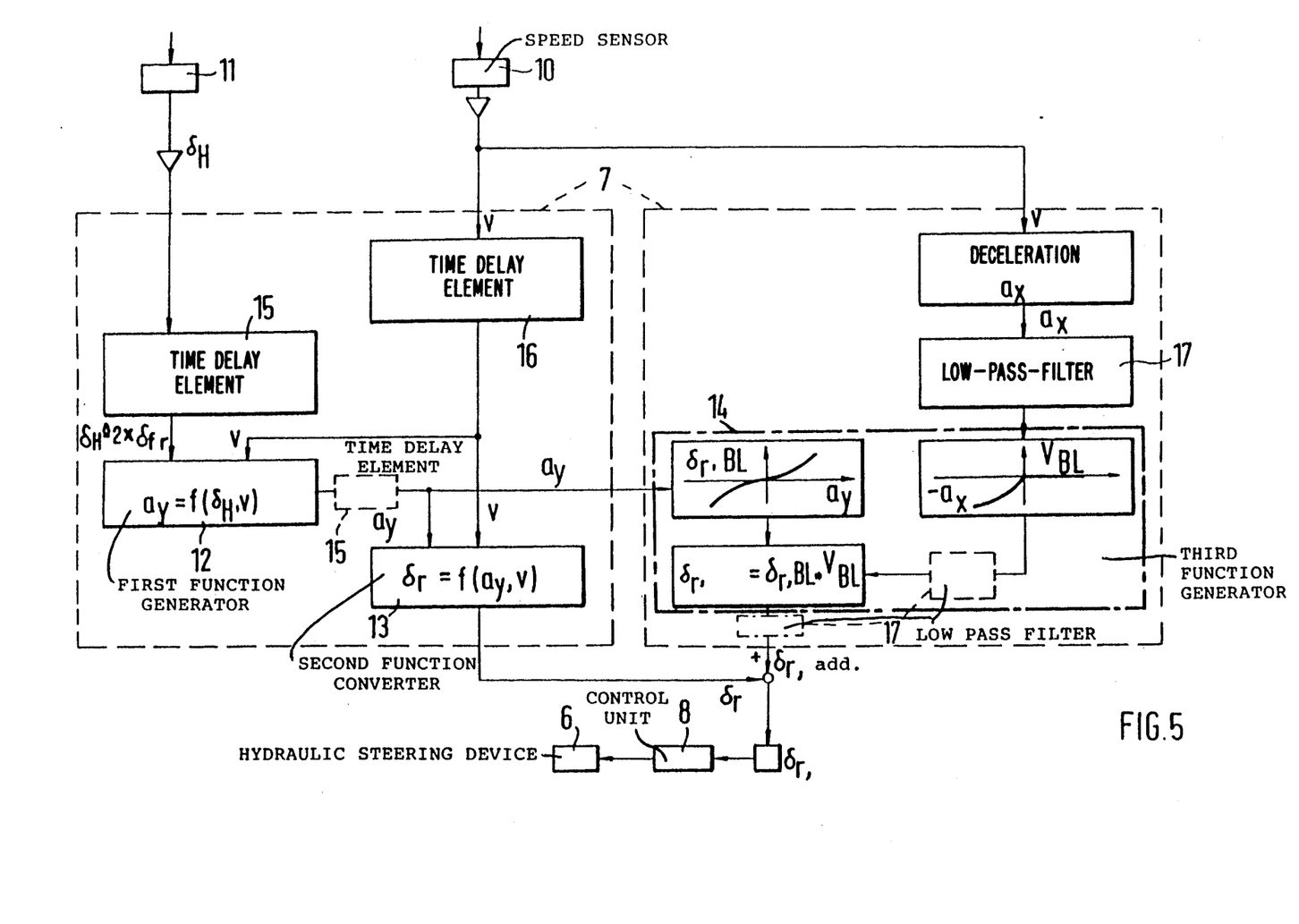
FIG. 5 is a schematic block diagram for the electronic control system of the four-wheel steering system.

In the operating condition of the vehicle, corresponding actual values are measured by a vehicle speed sensor 10 and a steering wheel angle sensor 11 and, as input signals vehicle speed v and steering wheel angle $\delta_H$ (which is known in the art to be related to the front wheel steering angle $\delta_r$ and the steering ratio i expressed as $\delta_H \doteq i \cdot \delta_f$), are fed to a first function calculation task apparatus 12 of the control unit 7 as best seen in FIG. 5. By means of these measured quantities v and $\delta_H$, under the condition that, for example, the sideslip angle $\beta = 0$, the actual lateral acceleration $a_y$ is computed according to equation (8) in the control apparatus. For this calculation, the geometric relationship of a vehicle (FIG. 2) and the understeer behavior of the vehicle (FIG. 3) during steady-state cornering is taken into account according to equations (1) to (5). The lateral acceleration $a_y$, which was calculated from the above-mentioned equations (1) to (5) in the function calculation task apparatus 12, is entered as an input signal, together with the additional input signal concerning the vehicle speed v, into a second function converter 13 of the control apparatus, in which the rear wheel steering angle $\delta_r$ is programmed and calculated according to equation (9) as a function of the vehicle speed v and the front wheel steering angle $\delta_f$.

In order to take into account a driving speed change, such as a longitudinal acceleration $-a_x$ or a longitudinal deceleration $a_x$, the calculated output signal concerning the lateral acceleration $a_y$, together with an additional signal from the vehicle speed change $a_x$ or $-a_x$, is fed to a third function calculation task apparatus 14 of the control apparatus 7. As shown in FIG. 5 this input signal $a_y$, calculated in function 12, and the input signals $-a_x$ or $a_x$, calculated in the function calculation task apparatus 14, are converted to an output signal additional rear wheel steering angle $\delta_{r,add}$, which is added to the output signal $\delta_r$ of the second function calculation task apparatus 13. The sum of these output signals $\delta_r$ and $\delta_{r,add}$, as the steering angle signal $\delta_{r,eff}$, are fed to the control unit 8 for the control of the hydraulic steering device 6 for the rear wheels 5.

In order to increase the directional control of a motor vehicle, the sideslip angle $\beta$ should be reduced, for the purpose of which, at the first function calculation task apparatus 12 and in the second function calculation task apparatus 13, a rear wheel steering angle $\delta_r$ is generated, which, in the center of gravity S of the vehicle, causes a sideslip angle $\beta = 0$, or a sideslip angle which can be reduced toward $\beta = 0$.

As shown in FIG. 4, up to a predetermined low speed $v_1$, a constant transmission ratio k of the steering angles $\delta_r$ and $\delta_f$ rear to front is to be adjustable, with a steering angle in the opposite direction. Starting at this predetermined speed $v_1$, a speed-dependent transmission ratio k of the steering angles rear to front must be adjustable, with a steering angle in the same and in the opposite direction.

Preferably, it is provided, as also shown in FIG. 4 in detail, that up to a speed of, for example, approximately $v = 12$ m/s, the constant transmission ratio of, for example, approximately $k = -0.18$ is adjusted. Starting at speeds of, for example, approximately 15 m/s, the rear wheels should perform a steering angle which is in the same direction as that of the front wheels, because as a result, a more indirect and controlled steering behavior of the vehicle is achieved.

For the time-delayed adjustment of the steering angle $\delta_{r,eff}$ at the rear wheels 5 with respect to the front wheels 3, a so-called delay element 15 is connected behind the first function calculation task apparatus 12, this delay element 15, which is connected behind the first function calculation task apparatus 12 being indicated in FIG. 5 by an interrupted line. By means of this delay element 15, the output signal of the lateral acceleration $a_y$ is, in a time-delayed manner, fed to the second function calculation task apparatus 13 and the third function calculation task apparatus 14. With the corresponding effect, the delay element 15, as shown by the solid lines in FIG. 5, may also be provided in front of the first function calculation task apparatus 12. The speed signal v concerning the actual speed from the speed sensor 10 is fed to the second function calculation task apparatus 13 by means of the delay element 16 with a time delay or a delay time $\delta_T$.

Since the longitudinal deceleration takes place before a load changing reaction, and as a result, a disadvantageous adjustment of the rear wheels takes place before the actual load changing reaction, this input of the input signal $a_x$ or $-a_x$ to the third function calculation task apparatus 14 must take place in a time-delayed manner. For this purpose, the signal $a_x$ or $-a_x$ passes through a low-pass filter 17 of the second or higher order. This low-pass filter 17 may be arranged in front or behind the third function calculation task apparatus 14, as shown by dash-dotted, interrupted and solid lines in FIG. 5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An active four-wheel steering system for a motor vehicle having front and rear wheels comprising:
   a) front wheel steering means for setting a front wheel steering angle ($\delta_f$) of the front wheels;
   b) rear wheel steering means for setting a rear wheel steering angle ($\delta_r$) of the rear wheels which can be adjusted with respect to the front wheel steering angle ($\delta_f$) in a variable wheel steering angle relationship;
   c) steering wheel means for controlling the front wheel steering means to set the front wheel steering angle ($\delta_f$);
   d) a steering wheel angle sensor for providing a steering wheel signal representative of a steering wheel angle ($\delta_H$) as set by a position of the steering wheel means;
   e) a vehicle speed sensing means for providing a vehicle speed signal representative of a vehicle speed (v);
   f) first function calculation task means for receiving the vehicle speed signal and said steering wheel angle signal and for generating a lateral acceleration signal ($a_y$) representative of a lateral acceleration of the vehicle as a function of the vehicle speed and steering angle signals and defined by the relationship $$a_y = \frac{\delta_f}{\frac{1 - 1_h}{v^2} + C_1 - C_3}$$

wherein $l$ is the wheel base, $l_h$ is the distance between a center of gravity of the motor vehicle and a rear axle, and $C_1$ and $C_3$ are constants;
   g) second function calculation task means for receiving the lateral acceleration signal and the vehicle speed signal and for generating a first rear wheel steering angle ($\delta_r$) signal representative of the rear wheel steering angle as a function of the lateral acceleration signal and the vehicle speed signal defined by the relationship $$\delta_r = -(l_h/v^2 + C_3) \cdot a_y$$

h) a hydraulic control means for receiving the first rear wheel steering angle signal and for controlling a valve-controlled adjusting means for adjusting the rear wheel steering angle of the rear wheels as a function of the first rear wheel steering angle signal.

2. A steering system according to claim 1, further comprising
   a) vehicle speed change sensor for providing a vehicle speed change signal representative of a vehicle speed change;
   b) third function calculation task means for receiving the lateral acceleration signal provided by the first function calculation task means and the vehicle speed change signal and for providing an additional rear wheel steering angle signal ($\delta_{r,\ add.}$); and
   c) addition means for adding the first rear wheel steering angle signal ($\delta_r$) and the additional rear wheel steering angle signal to provide an effective steering wheel angle signal ($\delta_{r,\ eff.}$) for the control of the rear wheels.

3. A steering system according to claim 2, wherein the signal representative of the rear wheel steering angle ($\delta_r$) outputted by the second function calculation task means is utilized to reduce a vehicle side slip angle ($\beta$) occurring at a center of gravity of the vehicle towards zero.

4. A steering system according to claim 1, further comprising means for providing a constant ratio of the steering angles ($\delta_r$, $\delta_f$) with opposite rear and front wheel steering angles up to a predetermined vehicle speed ($v_1$) and for adjusting the ratio of the steering angles ($\delta_f$, $\delta_r$) with rear and front steering angles in the same direction when the vehicle speed is at least equal to the predetermined vehicle speed ($v_1$).

5. A steering system according to claim 1, wherein, up to a predetermined vehicle speed of approximately 12 meters per second, said constant ratio of the steering wheel angles is approximately $-0.18$, with the steering angle of the front wheels being in the opposite direction to the steering angle of the rear wheels.

6. A steering system according to claim 2, further comprising steering angle signal delay means for adjustably providing the effective steering angle signal ($\delta_{r,\ eff.}$) provided to control the rear wheels in a time-delay manner with respect to an adjustment of the front wheels and lateral acceleration signal delay means for providing the lateral acceleration signal to the second and third function calculation task means in a time-delay manner.

7. A steering system according to claim 6, wherein the vehicle speed signal from the speed sensor is provided to the first and second function calculation task means via a time delay means.

8. A steering system according to claim 2, wherein the vehicle speed change signal passes through a low-pass filter with a time response of a second or higher order prior to being provided to the third function calculation task means.

9. A steering system according to claim 2, wherein the additional rear wheel steering angle ($\delta_{r,add}$) of the third function calculation task means passes through a low-pass filter having a time response of a second or higher order prior to being added with the first rear wheel steering angle signal.

10. An active fourwheel steering system for front wheels and rear wheels of a motor vehicle, having a first apparatus for steering the front wheels actuatable by a steering wheel, a second apparatus for steering the rear wheels comprising a hydraulic control unit with an adjusting device controllable as a function of measured driving condition quantities, including steering wheel angle ($\delta_H$) and vehicle speed (v), and an electronic control unit to which the measured driving condition quantities are fed as input signals to vary a wheel steering angle relationship between the rear wheels and the front wheels, wherein a first function calculator task apparatus of the electronic control unit is operative to analyze input signals representative of the measured steering wheel angle ($\delta_H$) and the vehicle speed (v) and to generate an output signal representative of lateral acceleration ($a_y$) when a sideslip angle ($\beta$) is reduced to zero according to the relationship $$a_y = \frac{\delta_f}{\frac{1-l_h}{V_2} + C_1 - C_3}$$

wherein 1 is the wheel base, $l_h$ is the distance between a center of gravity of the motor vehicle and a rear axle, and $C_1$ and $C_3$ are constants, in which ($\delta_f$) is a front wheel steering angle, and a second function calculator task apparatus of the electronic control unit to which is fed the output signal representative of the lateral acceleration ($a_y$) from the first function calculation task apparatus and the measured vehicle speed (v) is operative to generate an output signal representative of a desired rear wheel steering angle ($\delta_r$) to control the hydraulic control unit according to the relationship $$\delta_r = -(l_h/V_2 + C_3) \cdot a_y$$

such that the steering angle of the rear wheels can be automatically adjusted with respect to the front wheels in a defined and desired angular relationship.

11. A steering system according to claim 10, wherein the electronic control unit includes a third function calculation task apparatus to which is fed, as output signals, the output signal representative of the lateral acceleration ($a_y$) of the first function calculation task apparatus and an additional signal representative of a vehicle speed change and is operative to generate, according to the relationship $$\delta_{r,add} = \delta'_{r,BL} \cdot V_{BL'}$$

wherein $\delta_{r,add}$ is an output signal representative of additional rear wheel steering angles, $\delta'_{r,BL}$ is representative of a rear wheel steering angle during braking for powering-off maneuvers as a function of the lateral acceleration, and ($V_{BL'}$) is an amplification factor of the rear wheel steering angle ($\delta_r$) during braking and powering-off maneuvers as a function of longitudinal deceleration of the motor vehicle, and the electronic control unit being further operatively arranged to overlay the rear wheel steering angle ($\delta_{r,add}$) on the output signal representative of the rear angle steering angle ($\delta_r$) from the second function calculation task apparatus and to generate a signal constituting a sum of the two overlayed output signals ($\delta_r$ and $_{r,add}$) representative of an actual rear wheel steering angle ($\delta_r$ and $_{r,add}$) representative of an actual rear wheel steering angle ($\delta_{r,eff}$) for the hydraulic control unit.

* * * * *